United States Patent
Shirai et al.

(10) Patent No.: US 6,315,438 B1
(45) Date of Patent: Nov. 13, 2001

(54) VEHICLE HEADLAMP OF A MOVABLE REFLECTOR TYPE

(75) Inventors: Katutada Shirai; Takashi Matsunaga, both of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/387,184

(22) Filed: Aug. 31, 1999

(30) Foreign Application Priority Data

Aug. 31, 1998 (JP) .................................................. 10-244985
Jul. 7, 1999 (JP) .................................................. 11-192683

(51) Int. Cl.⁷ .................................................. F21V 29/00
(52) U.S. Cl. ..................... 362/507; 362/289; 362/287; 362/523; 362/530; 362/419; 362/421; 362/428; 362/284; 362/528; 362/529; 362/531; 362/532; 362/267
(58) Field of Search ..................... 362/289, 287, 362/523, 529, 530, 419, 421, 428, 284, 528, 531, 532, 267

(56) References Cited

U.S. PATENT DOCUMENTS 5,068,769     11/1991    Umeda et al. .
5,673,992 *   10/1997    Schmitt ................................. 362/66
5,678,915     10/1997    Shirai et al. .
6,017,136      1/2000    Burton ................................. 362/273
6,089,737 *    6/2000    Ito ....................................... 362/523
6,116,755 *    8/2000    Ichihara et al. ..................... 362/267
6,231,211 *    5/2001    Nishitani et al. ................... 362/267
6,231,220 *    5/2001    Shibuya et al. ..................... 362/507

FOREIGN PATENT DOCUMENTS 39 27 099     2/1991    (DE) .
0138217 A2    4/1985    (EP) .
0822118 A1    2/1998    (EP) .

* cited by examiner

*Primary Examiner*—Stephen Husar
*Assistant Examiner*—Anabel M Ton
(74) *Attorney, Agent, or Firm*—Koda & Androlia (57) ABSTRACT

A vehicle headlamp of a movable reflector type comprising a lamp body, a reflector having a lamp, and an aiming mechanism disposed between the lamp body and the reflector and structured so as to support the reflector and adjust the angle of the reflector with respect to the lamp body when aiming screws mounted in screw insertion holes of the lamp body are turned; and a portion of each of the aiming screws which is installed in and supported by the screw insertion hole is made of plastic, and annular elastic waterproofing ribs are formed on the plastic portion of the aiming screw so as to be brought into a sliding contact with the inner surface of the screw insertion hole, thus securing a waterproofing capability for the vehicle headlamp.

6 Claims, 6 Drawing Sheets

VEHICLE HEADLAMP OF A MOVABLE REFLECTOR TYPE

DETAILED DESCRIPTION OF THE INVENTION

1. Field of the Invention

The present invention relates to a vehicle headlamp of a movable reflector type in which a reflector having a light source is supported by an aiming mechanism that allows the reflector to be inclined.

2. Prior Art

A headlamp of a movable reflector for a vehicle has been conventionally known; and in this headlamp, a reflector has a light source (or a vehicle lamp) and is supported by an aiming mechanism so that the angle of the reflector is adjusted by the aiming mechanism.

The aiming mechanism generally comprises a single ball joint serving as a fulcrum of inclination and two aiming screws each of which is movable forward and rearward in its own axial direction. The aiming screws are rotatably supported in screw insertion holes formed in the lamp body. A nut member installed in the reflector is engaged with a thread portion of each one of the aiming screws that extend forward from the lamp body. When the aiming screw is turned, the nut member is moved forward or rearward along the aiming screw, so that the reflector is inclined around the inclination axis between the ball joint and the nut member, and the optical axis of the lamp is adjusted.

The screw insertion hole that supports the aiming screw in a rotatable fashion needs to have a sealing means therein, and "O"-rings are generally used as a sealing means so as to waterproof the rotation support portion which supports the aiming screw.

As seen from the above, since the conventional vehicle headlamp requires an "O"-ring that is installed in the rotation support portion, which is the screw insertion hole for the aiming screw, the number of components constituting the aiming mechanism tends so increase. In addition, the "O"-ring is usually of rubber and therefore easily deteriorates if it is exposed to water for an extended period. Accordingly, the use of the "O"-ring for a long time may deteriorate the waterproofing capability of the rotation support portion for supporting the aiming screw.

SUMMARY OF THE INVENTION

Accordingly, in order to overcome the problems experienced with the conventional structure, the object of the present invention is to provide a vehicle headlamp of a movable reflector type which is free of any sealing member such as an "O"-ring and which is capable of waterproofing the portion of the lamp body that supports the aiming screw.

The above-described object is accomplished by a unique structure of the present invention for a vehicle headlamp of a movable reflector type that comprises: a container-like lamp body, a reflector on which a light source is mounted, and an aiming mechanism disposed between the lamp body and the reflector so as to incline the reflector with respect to the lamp body by rotating an aiming screw that is rotatably supported in a screw insertion hole of the lamp body; and in the present invention, the screw insertion hole is defined by a cylindrical portion integrally molded with the lamp body, and the aiming screw is partially made of a synthetic resin on which an engagement portion for engaging the screw insertion hole is formed, the engagement portion having an elastic waterproofing rib of an annular shape that is integrally formed thereon and slidably comes into contact with the inner surface of the screw insertion hole.

With the structure described above, the annular elastic waterproofing rib, which is formed on the engagement portion of the aiming screw and arranged to slide on the inner surface of the screw insertion hole, is held in the screw insertion hole under a pressure contact state. Accordingly, the waterproofing capability of the cylindrical portion that rotatably supports the aiming screw is assured. In addition, since the waterproofing rib is made of a synthetic resin and has elasticity (flexibility), when the engagement portion of the aiming screw is inserted into the cylindrical portion (which is the screw insertion hole), the waterproofing rib is elastically deformed; accordingly, the aiming screw can be installed in the screw insertion hole without any obstruction, and the waterproofing rib does not prevent the rotation of the aiming screw. Furthermore, the waterproofing rib does not easily deteriorate compared to the conventional rubber-made "O"-ring, since it is made of a synthetic resin.

Further in the present invention, annular grooves that extend along both sides of the base portion of the waterproofing rib is formed in the outer surface of the portion of the aiming screw which is supported by the screw insertion hole.

Accordingly, the annular grooves enlarge the area of the outer surface of the engagement portion of the aiming screw, thus increasing the quantity of water which is held in the cylindrical portion (forming the screw insertion hole) that is a rotation support portion for supporting the aiming screw therein. Moreover, the gap between the engagement portion of the aiming screw and the screw insertion hole in the axial direction are formed into a meandering maze shape by the rib; thus, the annular grooves effectively prevent introduction of water into the lamp body.

In order to improve the waterproofing capability of the rotation support portion for supporting the aiming screw and prevent looseness thereof, it is preferable to minimize the gap between the engagement portion of the aiming screw and the screw insertion hole. However, in order to allow the aiming screw to be smoothly rotated, it is preferable to make the gap larger. These facts are thus contradicting. The annular grooves formed on both sides of the waterproofing rib extend the distance of the radial projection of the waterproofing rib without enlarging the gap between the engagement portion of the aiming screw and the screw insertion hole. Therefore, the elasticity (flexibility) of the waterproofing rib can be increased, and the waterproofing rib is able to easily follow the inner surface of the screw insertion hole. Thus, a contact pressure and sliding frictional resistance produced between the waterproofing rib and the inner surface of the screw insertion hole can be lowered, and the aiming screw can be rotated smoothly and inserted into the screw insertion hole smoothly.

Furthermore, in the present invention, the waterproofing rib is formed in a plural number so that they are aligned close to each other along the axial direction of the aiming screw.

By way of this structure, a plurality of annular sliding portions are formed between the waterproofing ribs and the inner surface of the screw insertion hole. Therefore, the waterproofing capability of the rotation support portion for supporting the aiming screw can be improved.

Furthermore, in the vehicle headlamp of a movable reflector type of the present invention, a flange to be engaged with the peripheral portion of the screw insertion hole is formed on the inner portion of the aiming screw so that the flange is integral to the engagement portion thereof; in addition, an elastic sealing flap, which is a skirt shape and brought into a sliding contact with the peripheral portion of the screw insertion hole, is formed on the flange.

With this structure, the elastic sealing flap of the aiming screw is held, in a pressure contact state, on the peripheral portion of the screw insertion hole and supports the aiming screw without causing any looseness, so that the waterproofing capability is rendered to the rotation support portion for supporting the aiming screw. Since the elastic sealing flap is made of a synthetic resin and has an elasticity (flexibility), the elastic sealing flap does not obstruct the rotation of the aiming screw.

Furthermore, in the above structure, the cylindrical portion which constitutes the screw insertion hole extends rearwards, and the rear end of the cylindrical portion is provided with a plurality of swing sections which are obtained by dividing the rear end of the cylindrical portion in its circumferential direction so as to expand and contract the end of the cylindrical portion in the radial direction. In addition, an engagement hook is formed on each one of the swing sections. The engagement hook engages an engaging groove formed along the periphery of the engagement portion of the aiming screw inserted into the screw insertion hole from the inside of the lamp body, thus positionally securing the aiming screw in its axial direction in cooperation with the flange.

Thus, when the aiming screw is pushed from the inside of the lamp body into the screw insertion hole, the swing sections at the rear end of the cylindrical portion are pushed by the rear end of the aiming screw and elastically deformed so that the diameter of rear end of the cylindrical portion enlarges in the radial direction. Thus, when the rear end of the aiming screw penetrates through the cylindrical portion, the engagement hooks of the swing sections engage the engaging groove of the aiming screw, and the flange is brought into contact with the peripheral portion of the screw insertion hole. As a result, the aiming screw is positioned and secured in the screw insertion hole or in the cylindrical portion.

DETAILED DESCRIPTION OF THE PREFERRED EMBODIMENTS

The embodiments of the present invention will be described in detail with reference to the accompanying drawings.

Referring to FIGS. 1–5, a reference numeral 10 represents a lamp body made of, for instance, a polypropylene resin and formed into a container-like shape. A front lens 12 is provided on a front opening of the lamp body 10, thus defining a lamp chamber. In the lamp chamber, a reflector 14 to which a bulb 18 serving as a light source is integrally mounted is disposed so that an aiming mechanism E can incline the reflector 14.

The aiming mechanism E includes a ball joint 20 which constitutes a fixed fulcrum of inclination and is interposed between the lamp body 10 and the reflector 14, a pair of aiming screws 30 and 40 rotatably supported by screw insertion holes 10a and 10b, respectively, that are formed in the lamp body 10, and a pair of nut members 38 and 48 respectively mounted to brackets 15a and 15b which project over the rear surface of the reflector 14 and engage thread portions 32 and 42 of the corresponding aiming screws 30 and 40 so as to constitute a movable fulcrum of inclination. The reference numeral 22 is a ball member mounted to a bracket 15c that projects over the rear surface of the reflector 14. A ball portion 23 of the ball member 22 is supported by a ball bearing portion 24 formed integral to the inside of the lamp body 10, thus defining a ball joint 20.

When the aiming screw 30 is rotated, the nut member 38 is moved forwards/rearwards (or moved toward and away from the front lens 12) along the thread portion 32 of the aiming screw 30. Thus, the reflector 14 is inclined around an inclination axis Ly (see FIG. 1) which connects the ball joint 20 to the nut member 48. When the aiming screw 40 is rotated, the nut member 48 is moved forwards/rearwards (or moved toward and away from the front lens 12) along the thread portion 42 of the aiming screw 40. Thus, the reflector 14 is inclined around an inclination axis Lx which connects the ball joint 20 to the nut member 38.

The aiming screw 30 thus constitutes a lateral aiming screw for adjusting the inclination of the optical axis of the lamp around the inclination axis Ly; and the aiming screw 40 constitutes a vertical aiming screw for adjusting inclination of the optical axis of the lamp around the inclination axis Lx.

Figure 3:
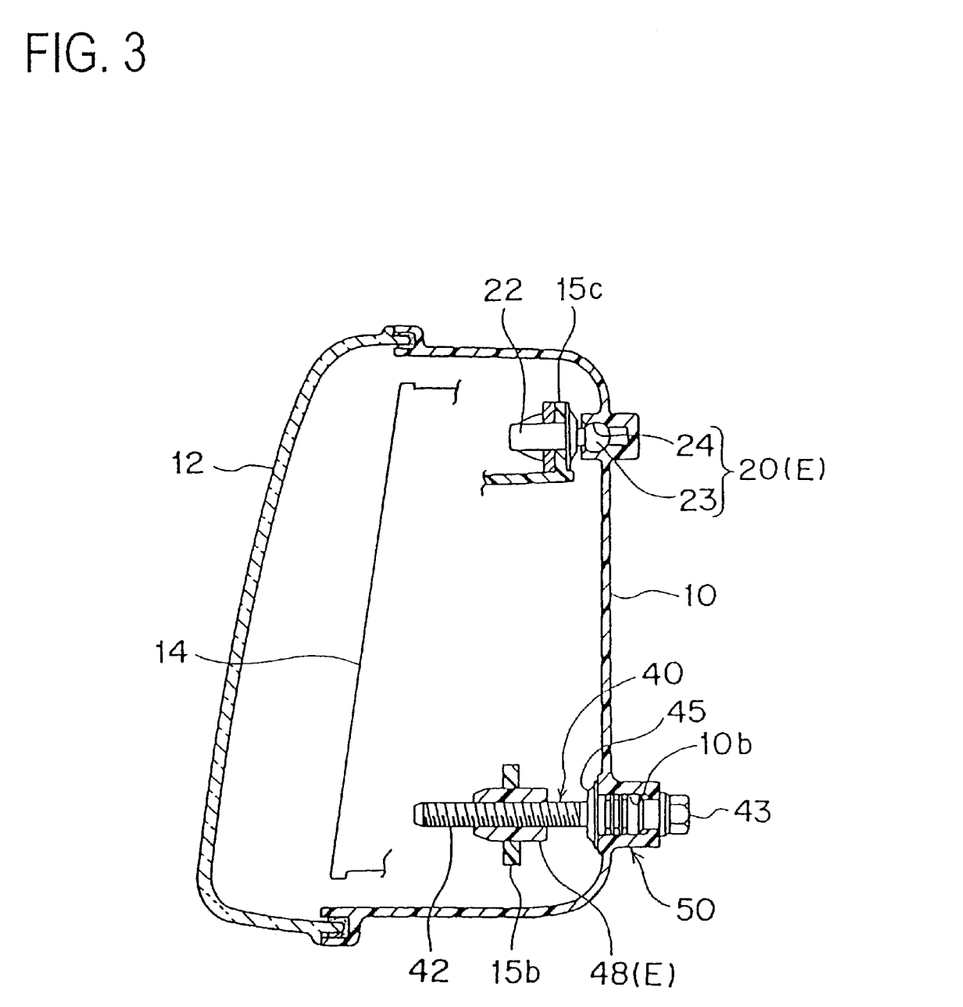
FIG. 3 is a vertical cross sectional view taken from the line 3—3 in FIG. 1.
Figure 4A:
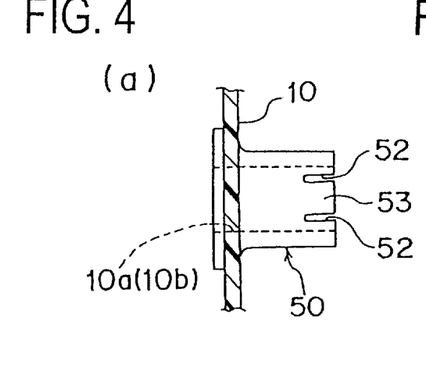
FIG. 4(a) is an enlarged side view of a cylindrical portion that is a rotation support portion for supporting the aiming screw.
Figure 4B:
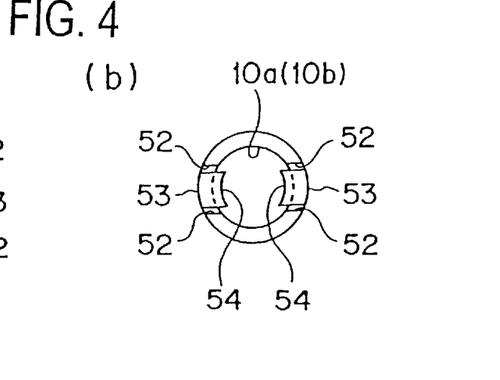
FIG. 4(b) is an enlarged end view of the cylindrical portion.
Figure 4C:
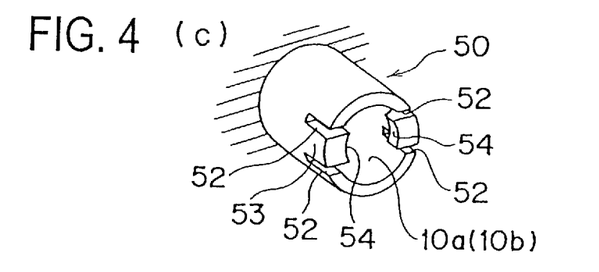
FIG. 4(c) is an enlarged perspective view of the cylindrical portion.

As shown in FIG. 4(a), each of the screw insertion holes 10a and 10b is defined by a cylindrical portion 50 which are integrally molded with the lamp body 10 and extend rearwards (or toward right in FIG. 3). A pair of slits 52 are formed in each one of the right and left side walls of a rear end of the cylindrical portion 50. The pair of slits 52 horizontally extend in the axial direction of the cylindrical portion 50, and they are located apart from each other for a predetermined distance in the vertical direction thereof as shown in FIG. 4(b). As a result, a pair of divided side walls 53 or swing sections are formed by the slits 52 in the horizontal direction, so that the side walls 53 can be moved in the lateral direction in the radial direction of the cylindrical portion 50. Furthermore, as best seen from FIGS. 4(b) and 4(c), an engagement hook 54 projecting inward in the radial direction is formed on the inner leading end of each one of the divided side walls 53.

Figure 5:
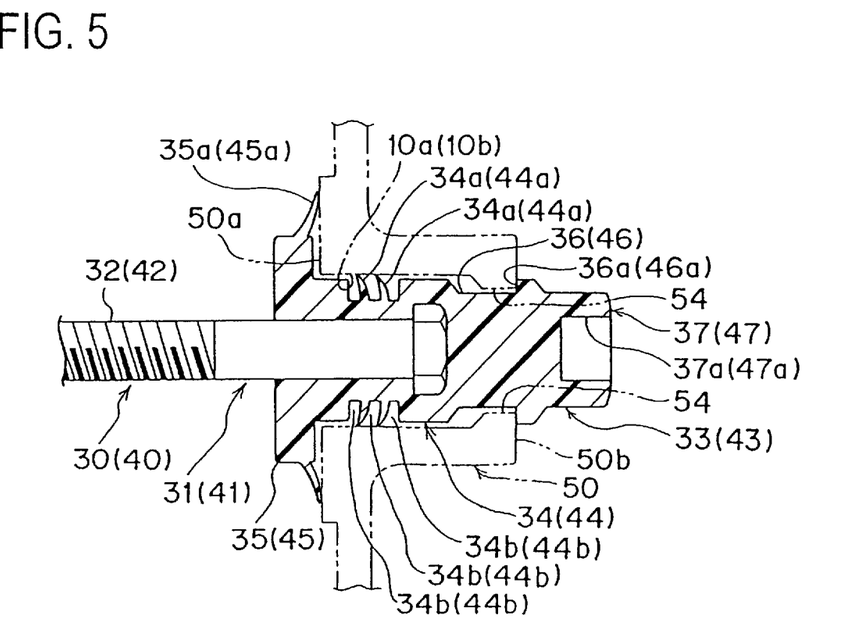
FIG. 5 shows an enlarged horizontal cross section of the main portion of the aiming screw.

FIG. 5 shows the detail of the aiming screws 30 and 40. Since these aiming screws are the same in the structure, the description will be made for the aiming screw 30, and the aiming screw 40 and related parts thereof are referred to in the parenthesis. As shown in FIG. 5, the aiming screw 30 (40) comprises a metal main portion 31 (41), which is located at the front end side where a thread portion 32 (42) is formed, and a polyacetal resin rear end portion 33 (43), which is located at the rear end side. Insert molding is performed to integrate the metal main portion 31 (41) to the polyacetal resin rear end portion 33 (43).

The reference numeral 34 (44) represents an engagement portion that is supported by the cylindrical portion 50 of the aiming screw 30 (40). A flange portion 35 (45) which abuts against a front end surface (the peripheral portion of the screw insertion hole) 50a of the cylindrical portion 50 is integrally formed with the front end portion of the engagement portion 34 (44). An engaging groove 36 (46) which engages the engagement hooks 54 of the cylindrical portion 50 is formed around a portion of the engagement portion 34 (44) that is adjacent to its rear end. The flange portion 35 (45) and the stepped portion 36a (46a) of the engaging groove 36 (46) adjacent to its rear end are brought into contact with the front and rear end surfaces 50a, 50b of the cylindrical portion 50 so as to establish engagement. Thus, the aiming screw 30 (40) can be securely positioned with respect to the screw insertion holes 10a, 10b in the axial direction.

A rotation operating portion 37 (47), which has an outer shape of a hexagonal cross section and incorporates a rectangular groove 37a (47a) formed at the end surface thereof, is integrally formed in a rear end (which is located on the rear side of the engagement portions 34 (44)) of the aiming screw 30 (40). The outer diameter of the rotation operating portion 37 (47) is not larger than that of the engagement portion 34 (44), so that the rear end portion of the aiming screw 30 (40) can be inserted into the screw insertion hole 10a (10b) of the cylindrical portion 50 from the front side of the headlamp (left-hand portion in FIG. 5).

Elastic waterproofing ribs 34a (44a) of an annular shape are integrally formed on the engagement portion 34 (44) of the aiming screw 30(40) so as to be brought into sliding contact with the inner surface of the cylindrical portion 50 (or the screw insertion holes 10a, 10b). The outer diameter of each of the waterproofing ribs 34a (44a) is slightly larger than the inner diameter of the screw insertion hole 10a (10b), so that the outer edge of each of the waterproofing ribs 34a (44a) can always press-contact the inner surface of the screw insertion hole 10a (10b). In the shown embodiment, two waterproofing ribs 34a are formed on the engagement portion 34 (44) of the screw 30 (40).

Annular grooves 34b (44b) extending along the waterproofing ribs 34a (44a) are formed on the outer surface of the engagement portion 34 (44) so as to be on both sides of each of the waterproofing ribs 34a (44a). Thus, the distance of radial projection of the waterproofing ribs 34a (44a) can be enlarged without enlarging the gap between the engagement portion 34 (44) of the aiming screw and the screw insertion hole; and the elasticity (the flexibility) of the waterproofing ribs 34a (44a) can be enhanced; and an appropriate press contact force is applied between the waterproofing ribs 34a (44a) and the screw insertion hole 10a (10b).

If the annular grooves 34b (44b) are not provided, the distance of projection of the waterproofing ribs is shortened and satisfactory elasticity (the flexibility) cannot be obtained. As a result, excessively high pressure contact force is exerted in the space between the waterproofing ribs 34a (44a) and the inner surface of the screw insertion hole 10a (10b). As a result, the torque for rotating the aiming screw increases too large to smoothly rotate the aiming screw and smoothly insert the aiming screw into the screw insertion hole. Also, so as to enhance the elasticity (the flexibility) of the waterproofing ribs 34a (44a), it is preferable to increase the gap between the engagement portion 34 (44) and the screw insertion holes 10a, 10b and to enlarge the amount of projection of the waterproofing rib. However, if such a gap is increased, the waterproofing capability deteriorates, and looseness of the aiming screw in the screw insertion hole is undesirably enlarged.

Therefore, in the shown embodiment, the annular grooves 34b (44b) are formed along the bases of the waterproofing ribs 34a (44a) so as to elongate the distance of projection of the waterproofing ribs 34a (44a) without enlarging the gap between the engagement portion 34 (44) and the inner surface of the screw insertion hole 10a (10b), that is, without deteriorating the waterproofing capability. Thus, the pressure contact force and sliding frictional resistance between the waterproofing ribs 34a (44a) and the inner surface of the screw insertion hole 10a (10b) are reduced, and the aiming screw 30 (40) can be smoothly rotated and smoothly inserted into the screw insertion hole 10a (10b).

Two waterproofing ribs 34a (44a) are formed in parallel with each other in the axial direction of the screw 30. Thus, the annular sliding contact portion between the waterproofing ribs 34a (44a) and the screw insertion hole 10a (10b) has two stages (or has two stage waterproofing means); and the waterproofing capability of the rotation support portion for supporting the aiming screw. which is the screw insertion hole, is improved.

The flange portion 35 (45) of the aiming screw 30 (40) is provided with an elastic scaling flap 35a (45a) that is formed into a skirt shape and arranged so as to be in sliding contact with the peripheral portion of the screw insertion hole 10a (10b). The elastic sealing flap 35a (45a) is in a press-contact with the front surface (the peripheral portion of the screw insertion hole) 50a of the cylindrical portion 50 of the lamp body 10 so as to maintain waterproofing capability of the rotation support portion for supporting the aiming screws 30 (40).

The elastic sealing flap 35a (45a) elastically supports the aiming screw 30 (40) in the axial direction and prevents the rotation support portion for supporting the aiming screw 30 (40) from getting loose.

Since the elastic sealing flap 35a made of synthetic resin has appropriate elasticity (flexibility), the elastic sealing flap 35a (or the sliding contact portion between the elastic sealing flap 35a and the peripheral portion 50a of the screw insertion hole) does not obstruct the rotation of the aiming screws 30, 40.

A method of mounting the aiming screws 30, 40 on the cylindrical portion 50 of the lamp body 10 will be described below.

Figure 1:
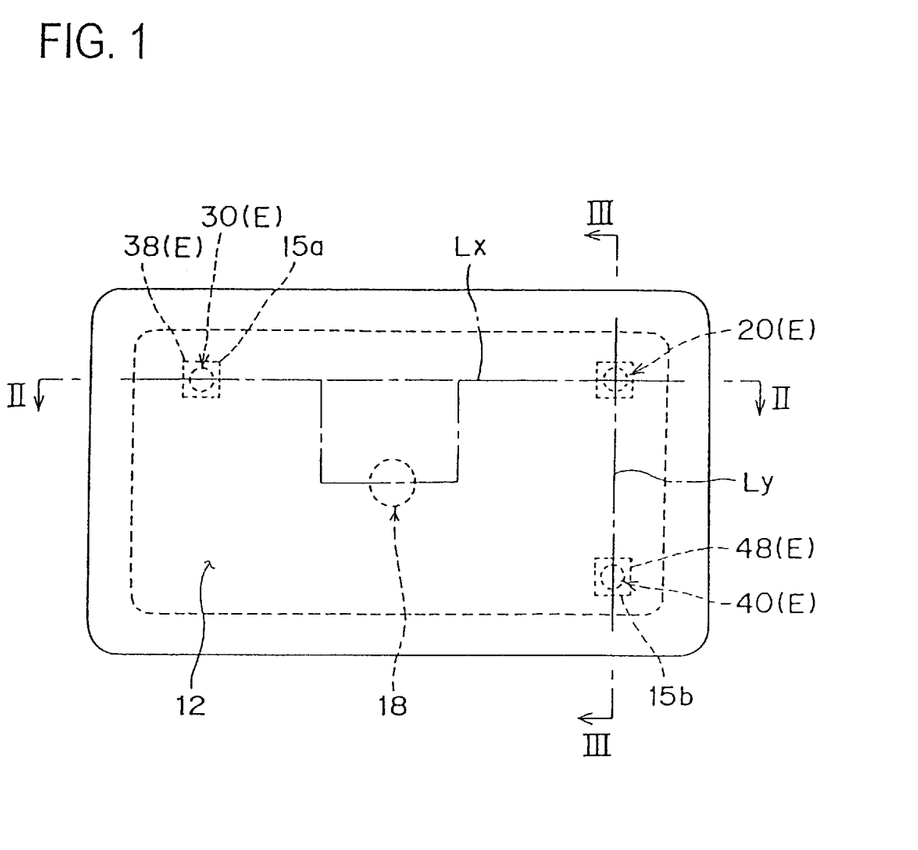
FIG. 1 is a front view of a vehicle headlamp according to a first embodiment of the present invention.
Figure 2:
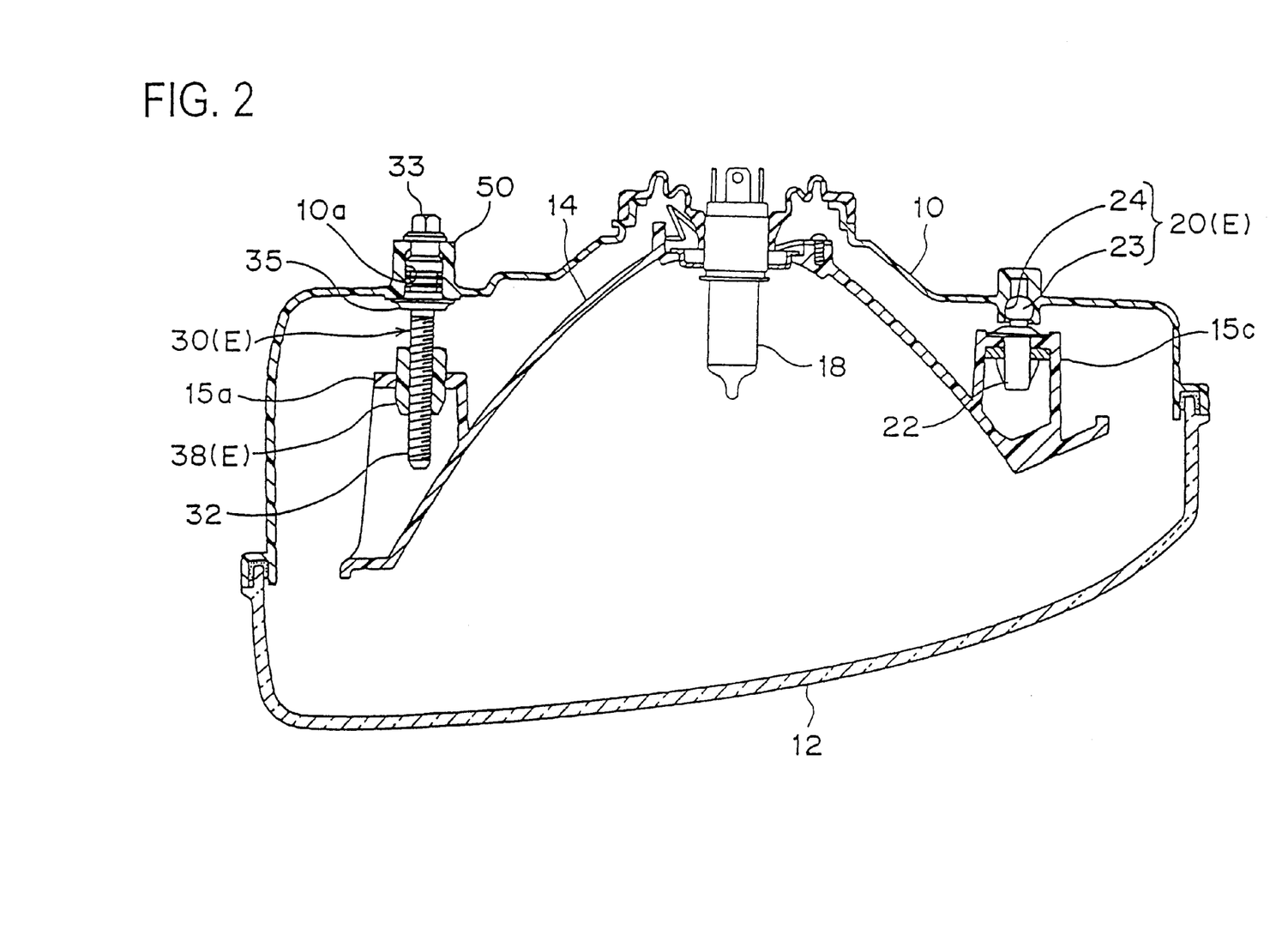
FIG. 2 is a horizontal cross sectional view taken along the line 2—2 in FIG. 1.

As a first step, as seen from FIGS. 2 and 3, the nut member 38 to which the aiming screw 30 has been screw-connected is attached to the bracket 15a of the reflector 14. and the nut member 48 to which the aiming screw 40 has been screw-connected is attached to the bracket 15b of the reflector 14. In addition, the ball member 22 is set in the bracket 15c.

Then, the ball portion 23 of the ball member 22 is press-fitted and engaged with the ball bearing portion 24 of the lamp body 10, and the rear end portions of the aiming screws 30 and 40 are respectively pushed into the screw insertion holes 10a and 10b of the lamp body 10. When the aiming screws 30 and 40 are thus pushed into the screw insertion holes 10a and 10b, the divided side walls 53 that constitute the rear end of the extended cylindrical portion 50 of the lamp body 10 are pushed by the rear ends of the aiming screws 30 and 40, and these divided side walls or swing sections 53 are elastically deformed so as to enlarge the diameter outward in the radial direction. Thus, the rear end of each of the aiming screws 30 and 40 penetrates the rear end of the cylindrical portion 50, and the engagement hooks 54 of the divided side walls or the swing sections 53 engage the engaging groove 36 (46) of each aiming screw, and the flange portion 35 (45) of the rear end portion 33 (43) of the aiming screw is brought into contact with the front end surface of the cylindrical portion (the peripheral portion of the screw insertion hole) 50a as best seen from FIG. 5. As a result, the aiming screw 30 (40) is positioned and secured in the screw insertion hole 10a (10b) of the lamp body 10.

Figure 6A:
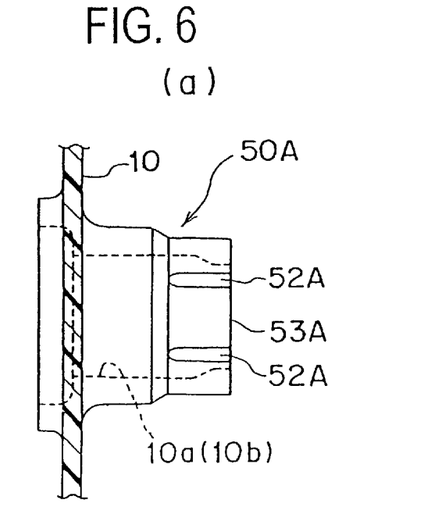
FIG. 6(a) is an enlarged side view of a cylindrical portion that is a rotation support portion for supporting the aiming screw according to the second embodiment of the present invention.
Figure 6B:
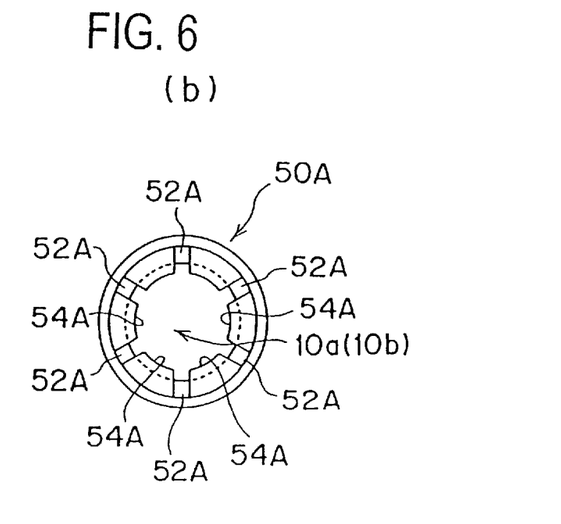
FIG. 6(b) is an enlarged end view thereof.
Figures 6C, 6D:
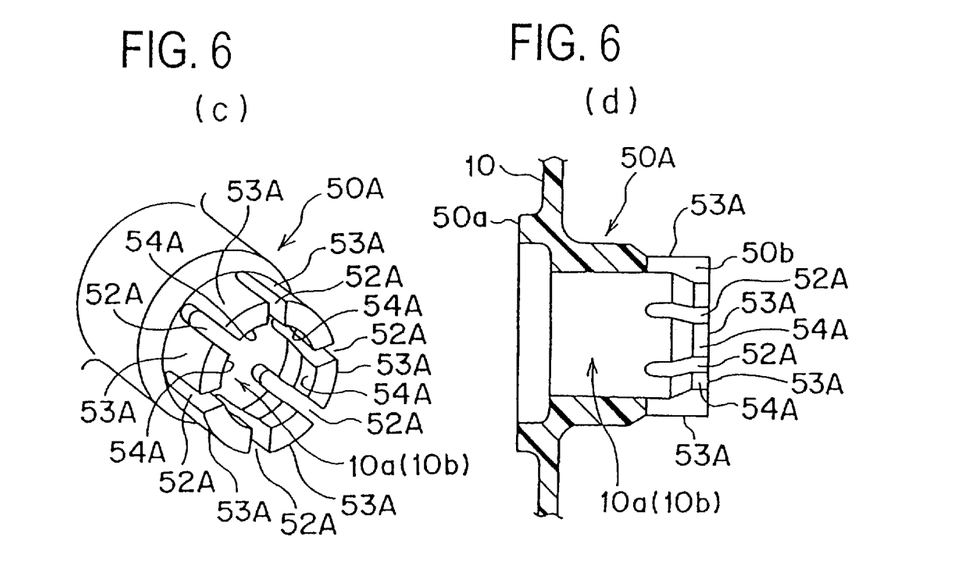
FIG. 6(c) is an enlarged perspective rear view thereof.
FIG. 6(d) is an enlarged cross sectional view thereof.
Figure 7:
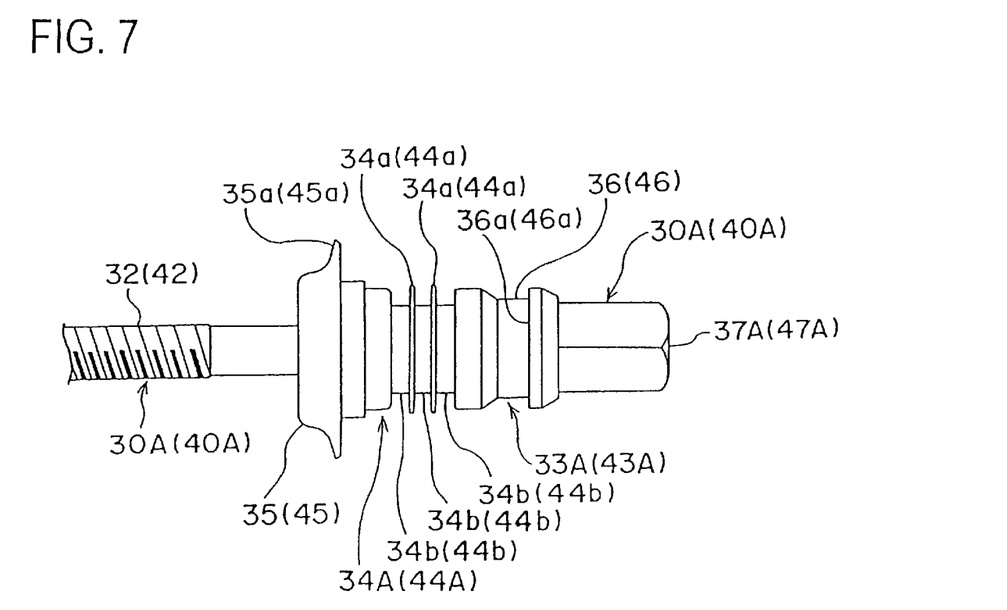
FIG. 7 is an enlarged side view of the engagement portion of the aiming screw according to the second embodiment of the present invention.
Figure 8:
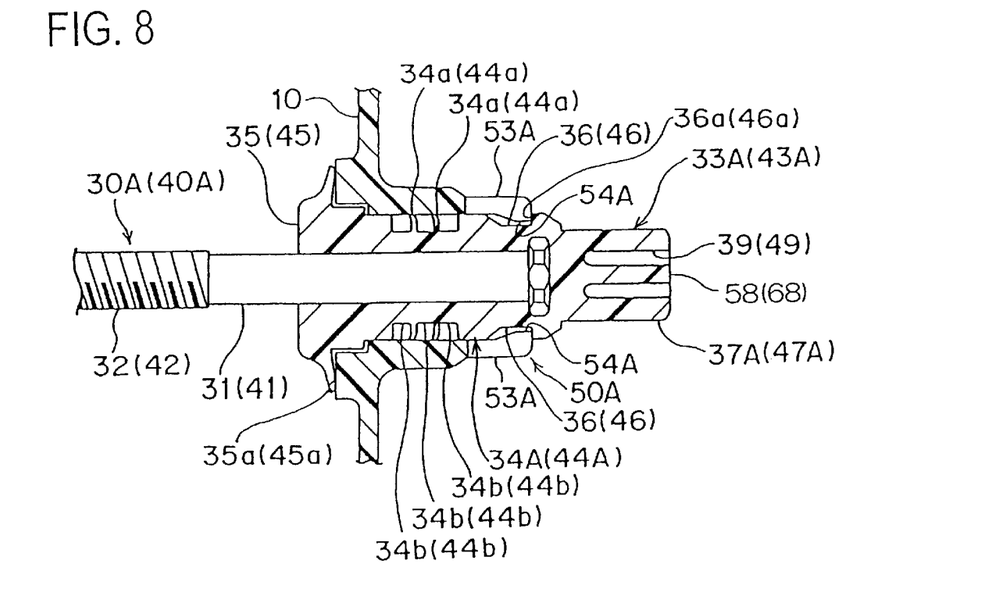
FIG. 8 is an enlarged cross sectional view thereof.

FIG. 6 through FIG. 8 show the second embodiment of the present invention.

The second embodiment is substantially the same as the first embodiment describe above; and the elements that are the same as those of the first embodiment are labeled with the same reference numerals, and a detailed description thereof is therefore omitted. The second embodiment differs from the first embodiment in the structure described below.

First, in the first embodiment, the engaging groove 36 (46) of the aiming screw 30 (40) that makes up part of the aiming mechanism E is supported by the engagement hooks 54 provided on the cylindrical portion 50. In the second embodiment, however, the engaging groove 36 (46) of the aiming screw 30 (40) that makes up part of the aiming mechanism E is supported by engagement hooks 54A formed on the cylindrical portion 50A.

More specifically, the end portion of the cylindrical portion 50A that extends rearward of the lamp body 10 is provided with six (6) slits 52A which are equally spaced in the circumferential direction of the cylindrical portion 50A. Thus, six (6) divided side walls 53A that are divided swing pieces located between the slits 52A are formed in a swingable fashion in the radial direction of the cylindrical portion 50A. Furthermore, on the inner side of the rear end of each one of the divided side walls 53A is formed with an engagement hook 54A so that the engagement hook 54A projects radially in an inward direction.

With this structure, the engaging groove 36 (46) circumferentially formed on the engagement portion of the aiming screw 30A (40A) is supported evenly by the divided side walls 53A of the cylindrical portion 50A. Accordingly, the aiming screw 30A (40A) is held in the screw insertion hole 10a (10b) of the lamp body 10 more securely compared to the first embodiment.

Secondly, like the aiming screw 30 (40) of the first embodiment, the aiming screw 30A (40A) of the second embodiment is comprised of the metal main portion 31 (41) and the polyacetal resin rear end portion 33A (43A). In the first embodiment, as seen from FIG. 5, the hexagon head of the main portion 31 (41) extends up to substantially the center of the rear end portion 33 (44) in the lengthwise direction thereof (or up to substantially half the length of the engagement portion of the aiming screw). However, in the second embodiment, the hexagon head of the main portion 31 (41) extends, as best seen from FIG. 8, so that it is located over the stepped portion 36a (46a) of the rear end portion 33A (43A) of the aiming screw (or the hexagon head is located beyond the engagement portion of the aiming screw).

As a result, the engagement portion 34A (44A) of the aiming screw 30A(40A) can have the structure in which the metal main portion 31 (41) extends, for substantially the entire length thereof, inside the rear end portion 33A (43A), so that the aiming screw of the second embodiment has an increased strength at its engagement portion compared to the first embodiment.

Thirdly, as in the first embodiment, the rear end of the aiming screw 30A (40A) (or the rear end of the rear end portion 33A (43A)) is provided with a rotation operating section 37A (47A) which is in a form of a hexagon headed bolt as best seen from FIG. 7. Inside this rotation operating section 37A (40A) is formed a circular hole 39 (49) so as to surround a cylindrical center projection 58 (68) and open rearward (or open to the right side in FIG. 8). This structure is employed so that sinking is less likely to occur inside the rotation operating section 37A (47A) when the resin rear end portion 33A (43A) is molded.

More specifically, when the rear end portion 33A (43A) is molded, dissolved resin is injected into the cavity from the gate of a mold through the cylindrical center projection 58 (68); and with the cylindrical center projection 58 (68) surrounded by the hole 39 (49), the rotation operating section 37A (47A) is formed with an even thickness, and the dissolved resin injected into the cavity from the gate can smoothly flow into the entire cavity of the mold that corresponds to the rotation operating section 37A (47A), thus the generation of sinking can be prevented.

In the above described two embodiments of the present invention, the lamp body 10 is made of polypropylene resin, and the rear end portions 33 (43) and 33A (43A) of the aiming screw 30 (40) and 30A (40A) are made of polyacetal resin that has appropriate elasticity, excellent wear resistance and a satisfactory feature of sliding with respect to the polypropylene resin. However, the rear end portions 33 (43) and 33A (43A) of the aiming screw 30 (40) and 30A (40A) can be made of nylon resin instead of polyacetal resin.

As seen from the above description, in the vehicle headlamp of a movable reflector type of the present invention, the waterproofing ribs are integrally formed on the aiming screws and brought into a sliding contact with the inner surfaces of the screw insertion holes; accordingly, the waterproofing capability is assured for the rotation support portion for supporting the aiming screw. Therefore, a sealing member, such as an "O"-ring, for the rotation support portion for supporting the aiming screw can be eliminated. As a result, the number of elements for constituting the headlamp aiming mechanism can be reduced, the structure of the aiming mechanism can be simplified, and the process for assembling the aiming mechanism can be facilitated.

In addition, since the waterproofing ribs are made of synthetic resins, deterioration of the waterproofing ribs can be prevented irrespective of exposure to water for an extended time. Thus, the waterproofing capability of the rotation support portion for supporting the aiming screw can be maintained for a long time.

Furthermore, an insertion resistance of the aiming screws into the screw insertion holes and a rotation torque of the aiming screws can be reduced without deteriorating the waterproofing capability of the rotation support portions for the aiming screws. Accordingly, the waterproofing capability of the rotation support portions for the aiming screws is secured, and smooth rotation of the aiming screws and smooth assembly of the aiming screws into the screw insertion holes can be realized.

Furthermore, since waterproofing is secured at a plurality of stages in the axial direction by way of a plurality of ribs, the waterproofing capability of the rotation support portion for supporting each of the aiming screws can be improved. In other words, the waterproofing capability is provided to the rotation support portion for supporting the aiming screw at two locations by way of the elastic waterproofing ribs in the screw insertion hole and by way of the elastic sealing flap in the peripheral portion of the screw insertion hole of the lamp body. Accordingly, the waterproofing of the rotation support portion for supporting the aiming screw is assured.

Furthermore, each of the aiming screws is mounted on the lamp body from the inner side of the lamp body. Accordingly, a reflector on which the aiming mechanism is integrally provided beforehand can be installed in the lamp body. Thus, the assembly of the headlamp can be significantly facilitated.

What is claimed is:

1. A vehicle headlamp of a movable reflector type comprising:

a container-like lamp body, a reflector to which a light source is mounted, and an aiming mechanism disposed between said lamp body and said reflector so as to support said reflector in such a manner that said reflector can be inclined with respect to said lamp body when an aiming screw rotatably supported in a screw insertion hole provided in said lamp body is rotated, wherein:

said screw insertion hole is defined by a cylindrical portion which is integrally formed in said lamp body, at least a portion of said aiming screw which is supported in said screw insertion hole is made of a synthetic resin, an elastic waterproofing rib is integrally formed on said portion made of synthetic resin on an engagement portion of said aiming screw which is supported by said screw insertion hole, said elastic waterproofing rib being in an annular shape and slidable on an inner surface of said screw insertion hole, and annular grooves extending along on both sides of a base portion of said waterproofing rib are formed on an outer surface of said engagement portion of said aiming screw.

2. A vehicle headlamp of a movable reflector type according to claim 1, wherein said waterproofing rib is provided in a plural number, and said plurality of waterproofing ribs are aligned with and close to each other along an axial direction of said aiming screw.

3. A vehicle headlamp of a movable reflector type according to claim 1 or 2, wherein a flange portion to be engaged with a peripheral portion of said screw insertion hole is integrally formed on axially one side of said engagement portion of said aiming screw, said flange portion being provided with a sealing means which has a skirt shape and is brought into a sliding contact with said peripheral portion of said screw insertion hole.

4. A vehicle headlamp of a movable reflector type according to claim 3, wherein said cylindrical portion which constitutes said screw insertion hole extends rearwards, one end of said cylindrical portion extending rearwards is formed with a plurality of swing sections which are obtained by dividing said one end of said cylindrical portion in a circumferential direction and are capable of enlarging and contracting said one end of said cylindrical portion in a radial direction thereof, and an engagement hook is formed on each of said swing sections, said engagement hook engaging an engaging groove formed in said engagement portion of said aiming screw inserted in said screw insertion hole so as to position said aiming screw in an axial direction thereof in said screw insertion hole.

5. A vehicle headlamp of a movable reflector type according to claim 2, wherein a flange portion to be engaged with a peripheral portion of said screw insertion hole is integrally formed on axially one side of said engagement portion of said aiming screw, said flange portion being provided with a sealing means which has a skirt shape and is brought into a sliding contact with said peripheral portion of said screw insertion hole.

6. A vehicle headlamp of a movable reflector type according to claim 5, wherein said cylindrical portion which constitutes said screw insertion hole extends rearwards, one end of said cylindrical portion extending rearwards is formed with a plurality of swing sections which are obtained by dividing said one end of said cylindrical portion in a circumferential direction and are capable of enlarging and contracting said one end of said cylindrical portion in a radial direction thereof, and an engagement hook is formed on each of said swing sections, said engagement hook engaging an engaging groove formed in said engagement portion of said aiming screw inserted in said screw insertion hole so as to position said aiming screw in an axial direction thereof in said screw insertion hole.

* * * * *